United States Patent
Oh

(10) Patent No.: US 8,159,811 B2
(45) Date of Patent: Apr. 17, 2012

(54) METAL CAPACITOR AND MANUFACTURING METHOD THEREOF

(76) Inventor: Young Joo Oh, Seoul (KR)

( * ) Notice: Subject to any disclaimer, the term of this patent is extended or adjusted under 35 U.S.C. 154(b) by 977 days.

(21) Appl. No.: 12/155,775

(22) Filed: Jun. 10, 2008

(65) Prior Publication Data

US 2009/0103234 A1 Apr. 23, 2009

(30) Foreign Application Priority Data

Oct. 19, 2007 (KR) .................... 10-2007-0105715
May 23, 2008 (KR) .................... 10-2008-0048003

(51) Int. Cl.
*H01G 4/00* (2006.01)
*H01G 4/30* (2006.01)
*H01G 4/008* (2006.01)
*H01G 4/20* (2006.01)

(52) U.S. Cl. ............... 361/303; 361/301.1; 361/301.2; 361/301.4; 361/305; 361/313

(58) Field of Classification Search ........... 361/303, 361/525, 528, 529, 540, 541, 301.1, 301.2, 361/301.4, 305, 313
See application file for complete search history.

(56) References Cited

U.S. PATENT DOCUMENTS

| 6,166,899 | A  |   | 12/2000 | Tamamitsu |
| 6,775,126 | B2 | * | 8/2004 | Fujii et al. ............ 361/523 |
| 6,917,514 | B2 | * | 7/2005 | Mido et al. ............ 361/533 |
| 7,326,261 | B2 | * | 2/2008 | Nagasawa et al. ...... 29/25.03 |

* cited by examiner

*Primary Examiner* — Nguyen T Ha
*Assistant Examiner* — Arun Ramaswamy
(74) *Attorney, Agent, or Firm* — Rosenberg, Klein & Lee

(57) ABSTRACT

A metal capacitor in which an electric conductivity is significantly improved by applying a metal material for an electrolyte and a manufacturing method thereof is provided. The capacitor includes a metal member comprising a groove forming portion where a plurality of grooves is formed, an electrode withdrawing portion formed on the groove forming portion, and a sealing portion; a metal oxide layer being formed on the metal member; an insulating layer being formed on the metal member to expose the electrode withdrawing portion of the metal member; a plurality of main electrode layers, each main electrode layer being formed on the metal oxide layer that is formed on the groove forming portion of the metal member; and a conductive connecting layer being formed on the plurality of main electrode layers and the insulating layer to face the electrode withdrawing portion of the metal member and connect the plurality of main electrode layers, wherein a lead terminal is connected to the electrode withdrawing portion of the metal member and each of the main electrode layers.

12 Claims, 6 Drawing Sheets

METAL CAPACITOR AND MANUFACTURING METHOD THEREOF

BACKGROUND

1. Field

The present invention relates to a metal capacitor and a manufacturing method thereof, and more particularly, to a metal capacitor in which an electric conductivity is significantly improved by applying a metal material for an electrolyte and a manufacturing method thereof.

2. Background

An aluminum electrolytic capacitor is used to smooth a power output from a power circuit to be a predetermined value, or is used as a low frequency bypass. Hereinafter, a method of manufacturing the aluminum electrolytic capacitor will be briefly described.

An etching process of etching the surface of an aluminum foil is performed to enlarge a surface area of the aluminum foil and thereby increase an electric capacity. When the etching process is completed, a forming process of forming a dielectric substance on the aluminum foil is performed. When cathode and anode aluminum foils are manufactured through the etching process and the forming process, a slitting process of cutting the manufactured aluminum foil and a separator by as long as a desired width based on the length of a product is performed. When the slitting process is completed, a stitching process of stitching an aluminum lead patch, which is a lead terminal, to the aluminum foil is performed.

When the slitting of the aluminum foil and the separator is completed, a winding process of disposing the separator between the anode aluminum foil and the cathode aluminum foil, and then winding the separator and the aluminum foils in a cylindrical shape and attaching a tape thereto, so as to not be unwounded. When the winding process is completed, an impregnation process of inserting the wound device into an aluminum case and injecting an electrolyte is performed. When the injecting of the electrolyte is completed, a curing process of sealing the aluminum case using a sealing material is performed. When the curling process is completed, an aging process of restoring a damage to the dielectric substance is performed. Through this, the assembly of the aluminum electrolytic capacitor is completed.

Due to the current development in digitalization and thinness of electronic devices, when applying the conventional aluminum electrolytic capacitor, there are some problems as follow.

Since the aluminum electrolytic capacitor uses the electrolyte, an electric conductive is comparatively low and thus a lifespan of the aluminum electrolytic capacitor is reduced in a high frequency area. Also, there are some constraints on improvement of reliability, a high frequency response, a low equivalent series resistance (ESR), and impedance. Also, due to a comparatively high ripple pyrexia, there are some constraints on stability and environments, such as fuming and firing.

SUMMARY OF THE INVENTION

The present invention is conceived to solve the above-described problems and thus provides a metal capacitor in which an electric conductivity is improved by about 10,000 to 1,000,000 folds by applying a metal material for an electrolyte, in comparison to when using a conventional electrolyte or an organic semiconductor, a multi-layer metal capacitor using the metal capacitor, and a manufacturing method thereof.

The present invention also provides a metal capacitor which can improve a miniature, a low equivalent series resistance (ESR), a reduction in a ripple pyrexia, a long life, a heat-resistant stability, non-fuming, non-firing, and environment by using a metal material for an electrolyte, and a manufacturing method thereof.

According to an aspect of the present invention, there is provided: a metal capacitor including: a metal member including a groove forming portion where a plurality of grooves is formed, an electrode withdrawing portion being formed on the groove forming portion, and a sealing portion; a metal oxide layer being formed on the metal member; an insulating layer being formed on the metal member to externally expose the electrode withdrawing portion of the metal member; a plurality of seed electrode layers, each seed electrode layer being formed on the metal oxide layer formed on the groove forming portion of the metal oxide; a plurality of main electrode layers being formed on the plurality of seed electrode layers to fill in the plurality of grooves formed on the groove forming portion of the metal member; a conductive connecting layer being formed on the plurality of main electrode layers and the insulating layer to face the electrode withdrawing portion of the metal member and connect the plurality of main electrode layers; a first lead terminal being connected to the electrode withdrawing portion of the metal member; a second lead terminal being connected to the main electrode layer; and a sealing member sealing the metal member connected to the first and the second lead terminals to externally expose the first and the second lead terminals.

According to another aspect of the present invention, there is provided a method of forming a metal capacitor, including: forming a groove forming portion that includes a plurality of grooves on both surfaces to thereby form a metal member integrally formed with an electrode withdrawing portion and a sealing portion by using a direct current (DC) etching method; forming a metal oxide layer on the metal member by using an anodizing method, when the groove forming portion, the electrode withdrawing portion, and the sealing portion are integrally formed on the metal member; forming an insulating layer on the metal electrode layer and/or the metal member to externally expose the electrode withdrawing portion of the metal member by using a CVD method; forming a main electrode layer on the metal oxide layer to fill in the plurality of grooves formed in the groove forming portion of the metal member by using an electroless planting or an electroplating; and, forming the conductive connecting layer, connecting the plurality of main electrode layers to the plurality of main electrode layers and the insulating layer, to face the electrode withdrawing portion of the metal member.

BRIEF DESCRIPTION OF THE DRAWINGS

The embodiments will be described in detail with reference to the following drawings in which like reference numerals refer to like elements wherein.

DETAILED DESCRIPTION

First Embodiment

Hereinafter, a configuration of a metal capacitor according to a first embodiment of the present invention will be described with reference to FIGS. 1 through 3.

Figure 1:
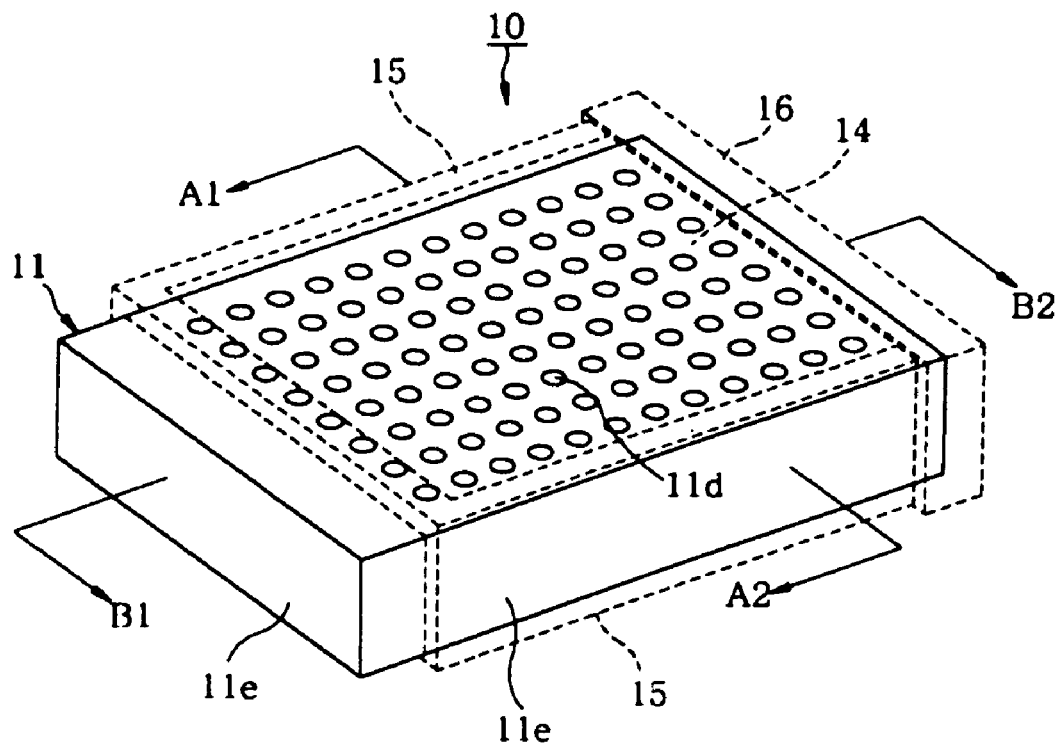
FIG. 1 is a perspective view of a metal capacitor according to a first embodiment of the present invention.
Figure 2:
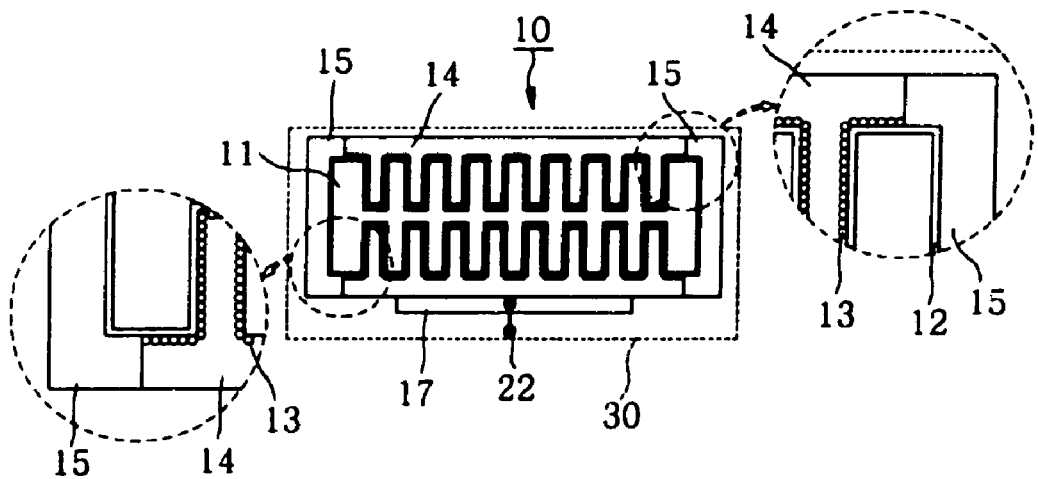
FIG. 2 is a cross-sectional view cut along A1-A2 line of the metal capacitor shown in FIG. 1.
Figure 3:
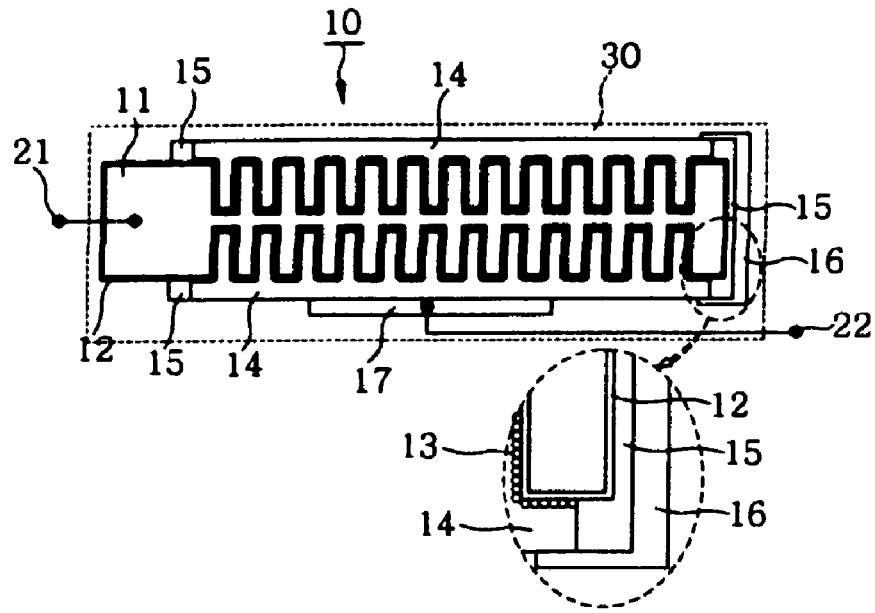
FIG. 3 is a cross-sectional view cut along B1-B2 of the metal capacitor shown in FIG. 1.

FIG. 1 is a perspective view of a metal capacitor 10 according to the first embodiment of the present invention, FIG. 2 is a cross-sectional view cut along A1-A2 line of the metal capacitor shown in FIG. 1, and FIG. 3 is a cross-sectional view cut along B1-B2 of the metal capacitor shown in FIG. 1. As shown in the figures, the metal capacitor 10 according to the first embodiment of the present invention includes a metal member 11, a metal oxide layer 12, a plurality of seed electrode layers 13, a plurality of main electrode layers 14, an insulating layer 15, a conductive conducting layer 16, a first lead terminal 21, a second lead terminal 22, and a sealing member 30. The seed electrode layer 13 may be removed and not be applied depending on requirement of the user.

Hereinafter, the configuration thereof will be sequentially described.

Figure 4A:
FIGS. 4A through 4H are cross-sectional views illustrating a method of manufacturing the metal capacitor according to the first embodiment of the present invention.
Figure 4B:
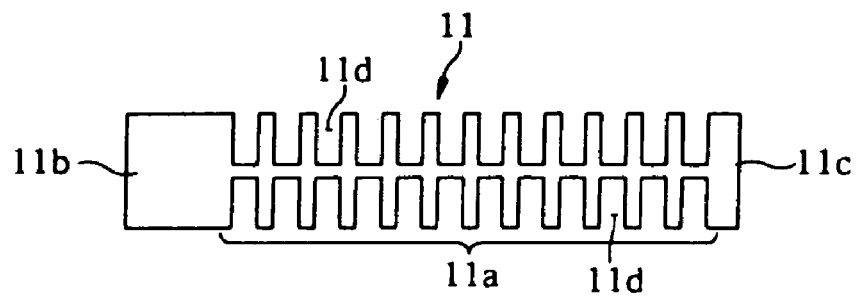

As shown in FIG. 4B, the metal member 11 is formed with a groove forming portion 11a that is provided by arranging a plurality of grooves 11d on its both surfaces. An electrode withdrawing portion 11b and a sealing portion 11c are formed in one end and another end of the groove forming portion 11a. When the electrode withdrawing portion 11b is formed in the one end of the groove forming portion 11a and the sealing portion 11c is formed in the other end of the groove forming portion 11a to face the electrode withdrawing portion 11b. The groove forming portion 11a, and the electrode withdrawing portion 11b and the sealing portion 11c that are formed in the one end and the other end of the groove forming portion 11a are integrally formed on the metal member 11. The metal member where the groove forming portion 11a, the electrode withdrawing portion 11b, and the sealing portion 11c are integrally formed uses any one of aluminum (Al), niobium (Nb), tantalum (Ta), titanium (Ti), and zirconium (Zr). The plurality of grooves 11d that is formed in the groove forming portion 11a of the metal member 11 using various types of metal materials is formed in a cylindrical shape to readily form the grooves 11d.

The metal oxide layer 12 is formed on the metal member 11, and uses any one of alumina ($Al_2O_3$), niobium monoxide (NbO), niobium pentoxide (Nb2O5), tantalum pentoxide (Ta2O5), titanium dioxide (TiO2), and zirconium dioxide (ZrO2) according to the material of the metal member 11. When forming the metal oxide layer 12, the metal oxide layer 12 is formed on the metal member 10, that is, on the whole surface of the metal member 10 that includes a surface where the grooves 11d are formed and a side 11e.

Figure 4C:
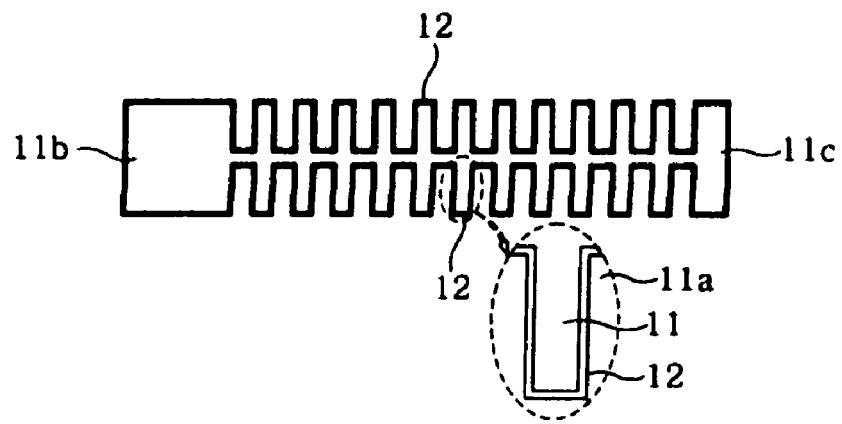
Figure 4D:
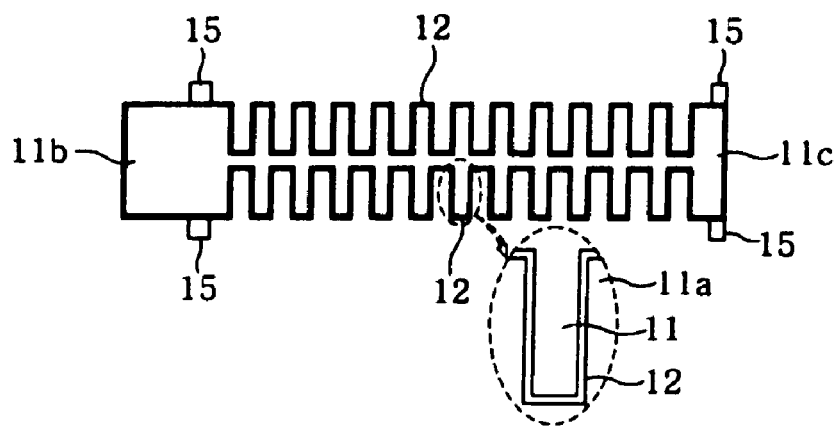

The insulating layer 15 is formed on the metal member 11 along the side 11e of the metal member 11 as shown in FIGS. 1 and 4D, so that the plurality of grooves 11d and the electrode withdrawing portion 11b of the metal member may be externally exposed. The insulating layer 15 can be formed after forming a plurality of main electrode layers 14. The insulating layer 15 is formed on all the remaining side 11e of the metal member 11, excluding the surface where the plurality of grooves 11d is formed. In this instance, the he electrode withdrawing portion 11b is formed to be externally exposed and the insulating layer 15 is formed of insulating tape or resin type material.

The plurality of seed electrode layers 13 is formed on the metal oxide layer 12 that is formed in the groove forming portion 11a of the metal member 11, so that the main electrode layer 14 may be filled in the surface of the plurality of grooves 11d and be formed. The seed electrode layer 13 may be removed and not be applied depending on requirement of the user.

The plurality of main electrode layers 14 is formed on the plurality of seed electrode layers formed on both surfaces of the groove forming portion 11a to fill in the plurality of grooves 11d formed on the groove forming portion 11a of the metal member 11.

The conductive connecting layer 16 is formed on the plurality of main electrode layers 14 and the insulating layer 15 to face the electrode withdrawing portion 11b of the metal member 11 and connect the plurality of main electrode layers 14. The conductive connecting layer 16 that is conductively connected to the plurality of main electrode layers 14 is formed on the opposite surface of the electrode withdrawing portion 11b to face the electrode withdrawing portion 11b.

Each of the conductive connecting layer 16 connecting the plurality of main electrode layers 14, the seed electrode layer 13, and the main electrode layer uses any one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au).

The first lead terminal 21 is connected to the electrode withdrawing portion 11b of the metal member 11. In this case, the first lead terminal 21 may connect the electrode withdrawing portion 11b and the metal oxide layer 12 formed on the electrode withdrawing portion 11b, or may connect the metal oxide layer 12 and the electrode withdrawing portion 11b after removing a part to be connected to the first lead terminal 21. When the first lead terminal 21 is connected, the second lead terminal is connected to the main electrode layer 14. Through this, the non-polar metal capacitor 10 is constructed.

In order to more readily connect the second lead terminal 22 to the main electrode layers 14, one of the main electrode layers 14 further include a conductive adhesive layer 17 for connecting the second lead terminal 22. The conductive adhesive layer 17 is formed using conductive epoxy or plating. The sealing member 30 seals the metal member 11 connected to the first and the second lead terminals 21 and 22, so that the first and the second lead terminals 21 and 22 may be externally exposed. The sealing member 30 uses EMC molding material or a cover member with an empty inside.

Hereinafter, a manufacturing method of the metal capacitor 10 according to the first embodiment of the present invention will be described with reference to the accompanying drawings.

As shown in FIGS. 4A and 4B, when a member 1 such as layer, foil, etc., of a metal material is provided, the groove forming portion 11a where the plurality of grooves 11d is arranged on both surfaces of the member 1 is formed and thereby the metal member 11 integrally formed with the electrode withdrawing portion 11b and the sealing portion 11c on one end and the other end is formed by a DC (Direct Current) etching.

The DC etching performs a pre-processing process for the member 1 in an aqueous solution with about 1% of phosphoric acid in the temperature of about 50° C. during about one minutes, and performs first etching in the mixture of sulfuric acid, phosphoric acid, aluminum, etc. in the temperature of about 70° C. through 90° C. during about two minutes. In this case, the current density is about 100 mA/$cm^2$ through 400 mA/$cm^2$. The DC etching performs second etching in the mixture of nitric acid, phosphoric acid, aluminum, etc., in the temperature of about 80° C. during five through ten minutes. In this case, the current density is about 10 mA/cm² through 100 mA/cm². When the first etching and the second etching are completed, chemical cleaning is performed in the solution of nitric acid 30 g through 70 g/l in the temperature of about 60° C. through 70° C. during about ten minutes. In case of the etching, etching structures are very simple and uniform and thus applies completely plating up to an inner end of the grooves.

The plurality of grooves 11d formed in the groove forming portion 11a is formed in the shape of a circle or a polygon and has a diameter of about 1 μm through about 100 μm. When the thickness of the metal member 11 is 1 μm, the depth of the metal member 10 is formed to be less than about 0.5 μm.

As shown in FIG. 4C, when the groove forming portion 11a, the electrode withdrawing portion 11b, and the sealing portion 11c are integrally formed on the metal member 11, a forming process of forming the metal oxide layer 12 on the metal member 11 by using an anodizing method is performed.

The anodizing method initially performs a boiling process in the temperature of about 80° C. through 100° C. during one through fifteen minutes in a deionized water, proceeds first oxidation in an aqueous solution of boric acid and boric acid-ammonium with 120 through 150 voltages, and proceeds a plurality of, two or three times of oxidations with changing the concentration and the voltage of the aqueous solution. The anodizing method performs a thermal treatment in the predetermined temperature, for example, in the temperature of 400° C. through 600° C. to perform a reforming process. Also, the anodizing method proceeds a by-product treatment in order to disposal and remove the by-product generated in the reforming process. Also, the anodizing method repeats the reforming process and the thermal treatment and proceeds a predetermined cleaning process in order to clean boric acid or phosphoric acid.

As shown in FIG. 4D, a through type metal member 10a is formed by forming the insulating layer 15 on the main electrode layer 14 and/or the metal member 11 by using a CVD (Chemical Vapor Deposition), so that the electrode withdrawing portion 11b of the metal member 11 may be externally exposed. Although the CVD is used herein, it is possible to apply any one of dipping process using an insulating resin or insulating ink, a spray process using ink-jet printing or screen printing, and a stamping process.

Figure 4E:
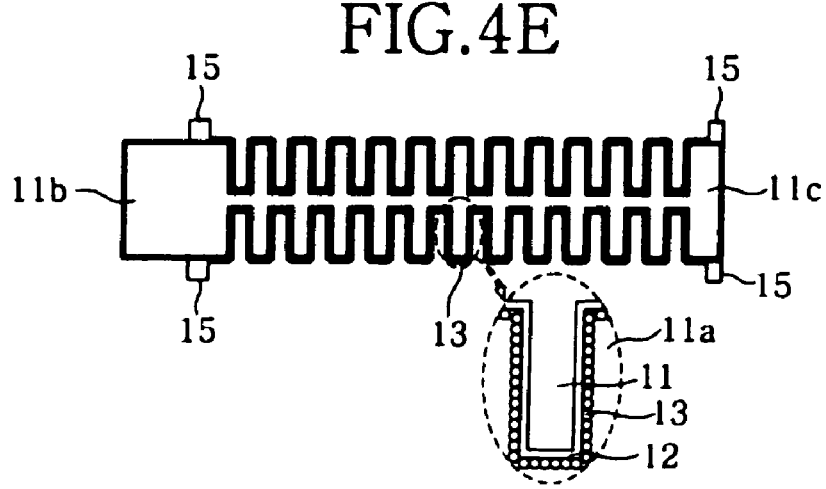

As shown in FIG. 4E, the plurality of seed electrode layers 13 is formed on the metal oxide layer 12 that is formed in the groove forming portion 11a to be penetrated into the metal oxide layer 12 by using an electroless plating or an electroplating. However, the seed electrode layer 13 may be removed and not be applied depending on requirement of the user.

The manufacturing method deposits a predetermined amount of palladium sulfate aqueous solution as an activator during 10 through 300 seconds in the seed electrode layer forming process and removes the activator of surface thereof by dipping and cleaning during one through thirty seconds at the normal temperature. Nickel phosphate aqueous solution applies in the nickel electroless plating and plates during about five through twenty minutes by adjusting pH range (4 through 8 pH) and temperature (50° C. through 80° C.). In this case, the seed electrode layer 13 forms in an inner part of the through-holes 11d. An additional plating process and a dry process less than 100° C. may be performed depending on requirement of a user.

Figure 4F:
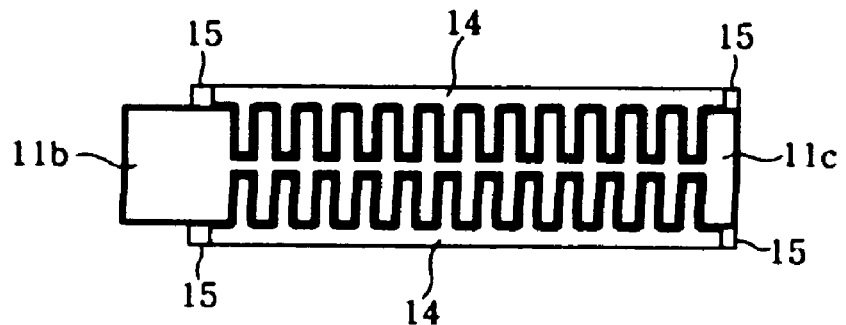

As shown in FIG. 4F, the plurality of main electrode layers 14 is formed to fill in the plurality of grooves 11d formed in the groove forming portion 11a by using the electroless plating or the electroplating.

In the electroplating for forming the main electrode layer 14, the electroplating method adjusts pH range (1 through 5 pH) and temperature (30° C. through 70° C.) and applies D.C. (Direct Current) with current density of 20 through 120 mA/cm² in sulfuric acid nickel aqueous solution or nickel chloride aqueous solution.

In the electroless plating for forming the main electrode layer 14, the electroless plating method adjusts pH range (5 through 7 pH) and temperature (70° C. through 90° C.) and proceeds material having seed electrode layer 13 during about ten through thirty minutes and removes plating solution components of surface thereof by dipping and cleaning during one through thirty seconds at the normal temperature.

Figure 4G:
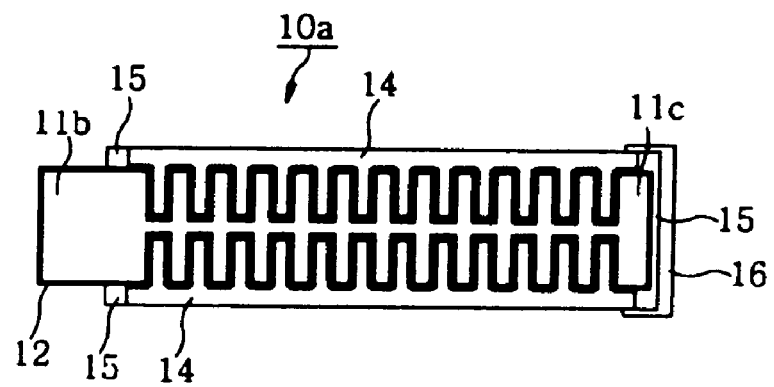
Figure 4H:
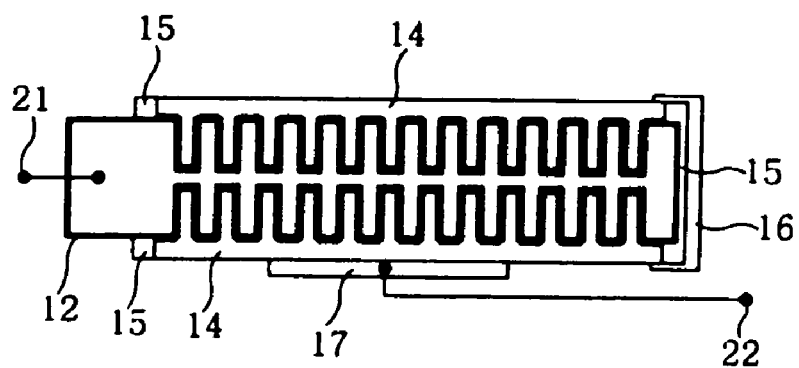

As shown in FIGS. 4G and 4H, when the plurality of main electrode layers 14 is formed, a non-through type metal member 10a is formed by forming the insulating layer 15 on the plurality of main electrode layers 14 and the side 11e of the metal member 11 along the side 11e of the metal member 11 by using a CVD method, so that the electrode withdrawing portion 11b of the metal member 11 may be externally exposed. The insulating layer 15 is formed using an insulating tape or a resin material. As shown in FIG. 4H, a conductive connecting layer 16 is formed on the plurality of main electrode layers 14 and the insulating layer 15 to face the electrode withdrawing portion 11b of the metal member 11 in order to connect the plurality of main electrode layers 14. A process of forming a conductive adhesive layer on the main electrode layer 14 connected to the second lead terminal 22 in order to improve the adhesiveness of the first and the second lead terminals 21 and 22 is further provided between the process of forming the conductive connecting layer 14 and the process of connecting the first and the second lead terminals 21 and 22. The method of forming the conductive adhesive layer 17 uses any one of a method of spraying metal adhesives or solder paste, the electroplating, and the electroless plating.

As shown in FIG. 4H, the first and the second lead terminals 21 and 22 are connected to the electrode withdrawing portion 11b of the metal member 11 and each of the main electrode layers 14a. As shown in FIG. 3, when the first and the second lead terminals 21 and 22 are connected, the metal member 11 is sealed with the sealing member 30 so that the first and the second lead terminals 21 and 22 may be externally exposed. When sealing the metal member 11 with the sealing member 30, the metal member 11 is sealed using molding material or a cover member with an empty inside.

Embodiment 2

Figure 5:
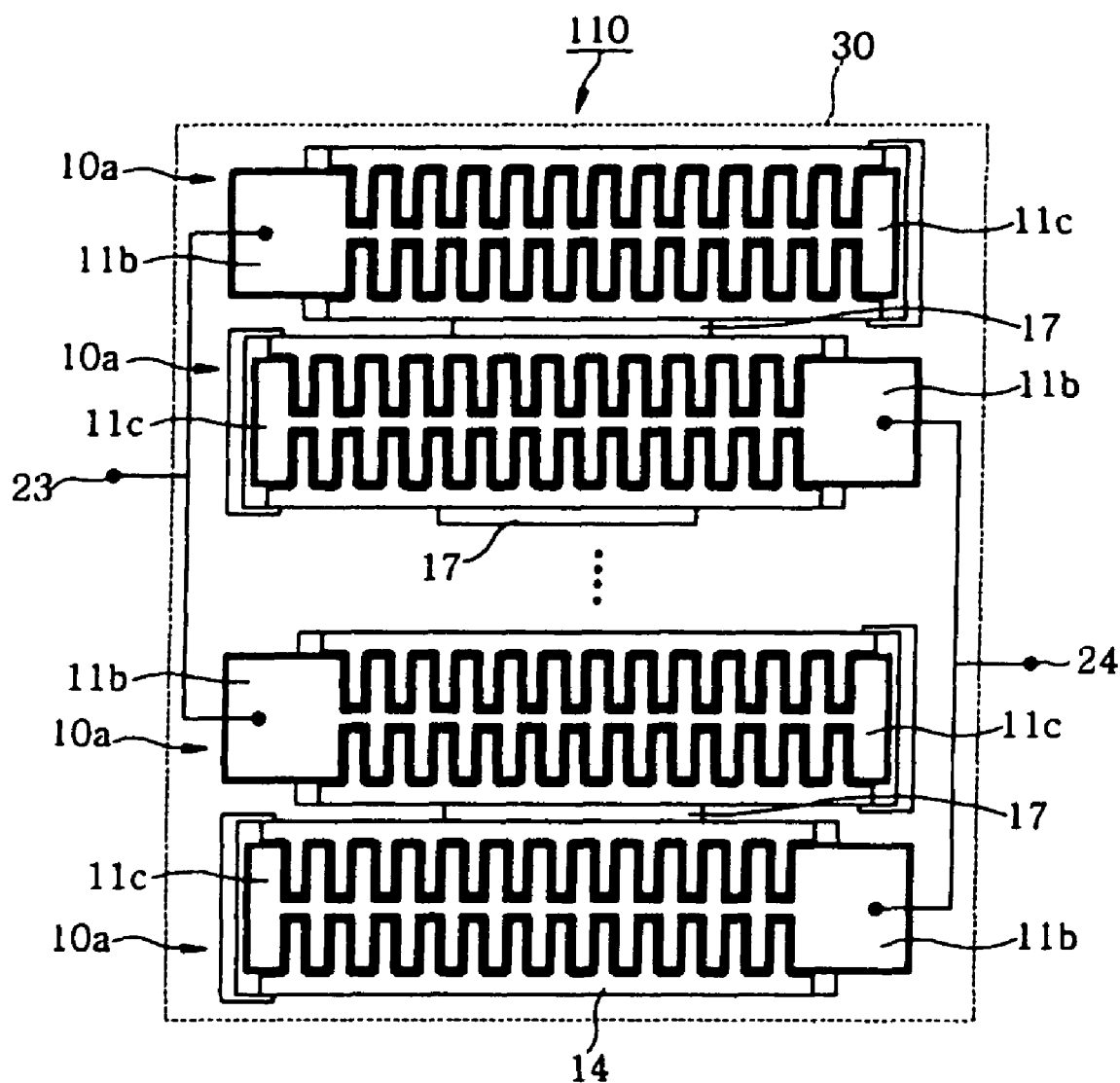
FIG. 5 is a cross-sectional view of a metal capacitor according to a second embodiment of the present invention.

As shown in FIG. 5, the metal capacitor 110 according to the second embodiment of the present invention includes a plurality of non-through type metal members 10a, a conductive adhesive layer 17, a third lead terminal 23, a fourth lead terminal 24, and a sealing member 30. Hereinafter, the configuration thereof will be sequentially described.

As shown in FIGS. 4G and 4H, each of the plurality of non-through type metal members 10a includes the metal member 11, the metal oxide layer 12, the plurality of seed electrode layers 13, the plurality of main electrode layers 14, the insulating layer 15, and the conductive connecting layer 16. The configuration thereof has been described above when describing the metal capacitor 10, and thus further detailed descriptions will be omitted here. As shown in FIG. 5, the plurality of non-through type metal members 10a is disposed in turn to make the electrode withdrawing portion 11b face one direction and another direction. That is, the electrode withdrawing portion 11b is alternatively located at the non-through type metal members 10a.

The conductive adhesive layer 17 is disposed between the main electrode layers 14 of the plurality of non-through type metal members 10a and thereby adheres the plurality of non-through type metal members 10a where the electrode withdrawing portion 11b is disposed in turn to face the one direction and the other direction.

The third lead terminal 23 is connected to the electrode withdrawing portion 11b of the non-through type metal member 10a that faces one end, and the fourth lead terminal 24 is connected to the electrode withdrawing portion 11b of the non-through type metal member 10a that faces the other end. Through this, non-polar metal capacitor 110 is constructed. Specifically, since each of the third and the fourth lead terminals 23 and 24 is connected to the electrode withdrawing portion 11b of the non-through type metal member 10a formed with the metal oxide layer 12 having the same polarity. Accordingly, the metal capacitor 110 is constructed to have the non-polarity.

When the third and the fourth lead terminals 23 and 24 are connected, the sealing member 30 seals the plurality of non-through type metal members 10a so that the third and the fourth lead terminals 23 and 24 may be externally exposed.

Embodiment 3

Figure 6:
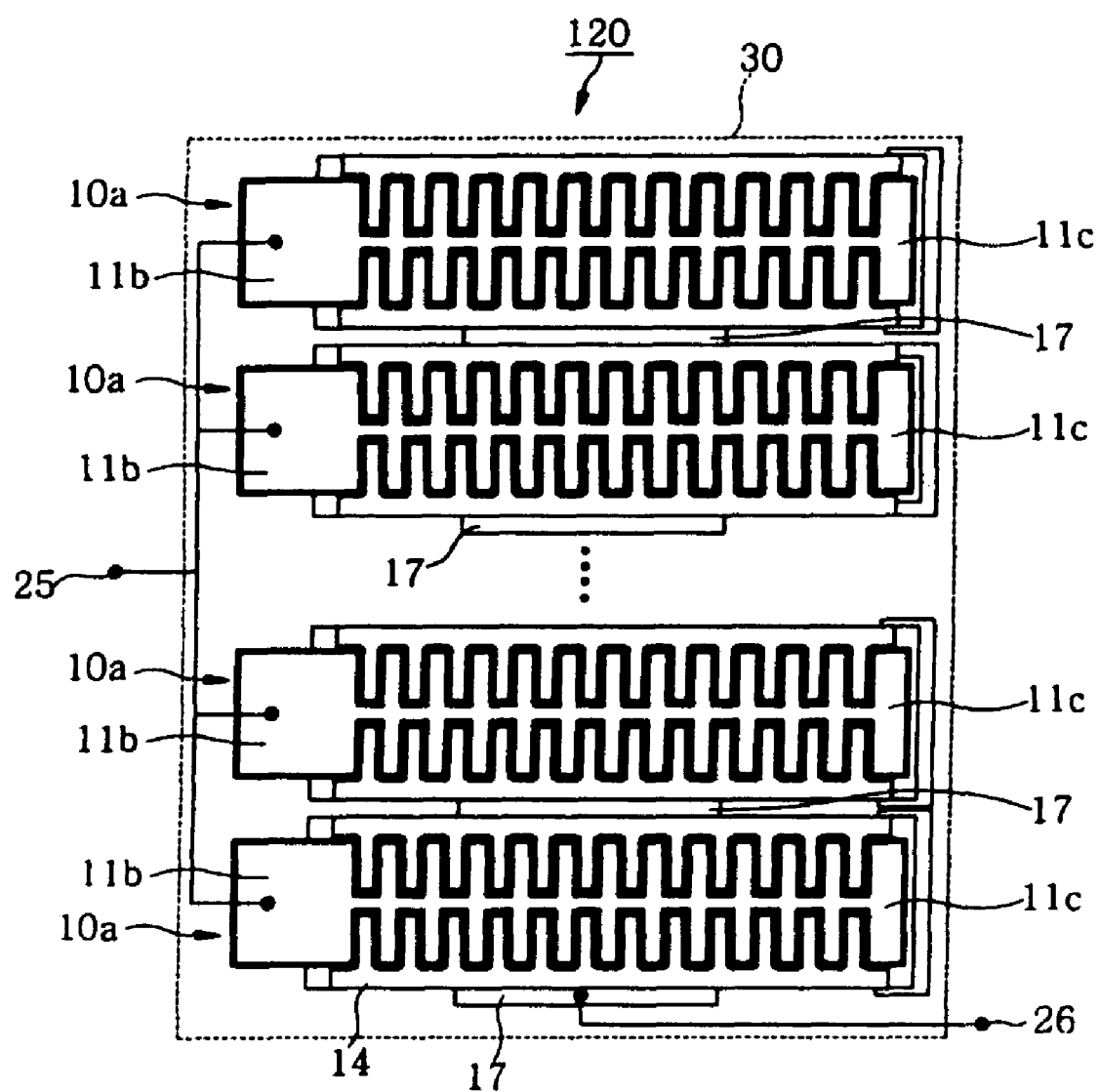
FIG. 6 is a cross-sectional view of a metal capacitor according to a third embodiment of the present invention.

As shown in FIG. 6, the meal capacitor 120 according to the third embodiment of the present invention includes a plurality of non-through type metal members 10a, a conductive adhesive layer 17, a first polar lead terminal 25, and a second polar lead terminal 26. Hereinafter, the configuration thereof will be sequentially described.

As shown in FIGS. 4G and 4H, each of the plurality of non-through type metal members 10a includes the metal member 11, the metal oxide layer 12, the plurality of seed electrode layers 13, the plurality of main electrode layers 14, the insulating layer 15, and the conductive connecting layer 16. The configuration thereof has been described above when describing the metal capacitor 10, and thus further detailed descriptions will be omitted here. As shown in FIG. 6, the plurality of non-through type metal members 10a is disposed to make the electrode withdrawing portion 11b face the same direction.

The conductive adhesive layer 17 is interposed between the main electrode layers 14 of the plurality of through-type metal members 10a. Also, the plurality of non-through type metal members 10a to be attached at the conductive adhesive layer 17 are attached with opposed direction as shown in FIG. 6.

The first polar lead terminal 25 is connected to the electrode withdrawing portions 11b of the plurality of non-through type metal members 10a. That is, the first polar lead terminal 25 is connected to electrode withdrawing portions 11b formed at the plurality of non-through type metal members 10a located at the left as shown in FIG. 6.

The second lead terminal 26 is connected to one of the main electrode layers 14 of the plurality of non-through type metal members 10a. Through this, the polar metal capacitor 120 is constructed.

In this instance, the first polar lead terminal 25 is connected to the electrode withdrawing portion 11b of the metal member 11 that is formed on the metal oxide layer 12 to be a positive electrode, and thus functions as an anode electrode. The second polar lead terminal 26 connected to the main electrode layer 14 not formed on the metal oxide layer to be a negative electrode and thus functions as a cathode electrode.

The metal member 11 that includes the electrode withdrawing portion 11b connected to the first polar lead terminal 25 may function as the negative electrode. When the metal member 11 functions as the negative electrode, the main electrode layer 14 functions as the positive electrode. Accordingly, when the second polar lead terminal 26 is applied to the cathode electrode, the first polar lead terminal 25 is applied to the anode electrode. Conversely, when the second polar lead terminal 26 is applied to the anode electrode, the first polar lead terminal 25 is applied to the cathode electrode. Also, when the first polar lead terminal 25 is applied to the cathode electrode, the second polar lead terminal 26 is applied to the anode electrode. Conversely, when the first polar lead terminal 25 is applied to the anode electrode, the second polar lead terminal 26 is applied to the cathode electrode.

The conductive adhesive layer 17 is formed on the main electrode layer 14 connected with the second polar lead terminal 26 that functions as either the cathode electrode or the anode electrode. When the first and the second lead terminals 25 and 26 that function as the anode or the cathode electrode are connected, the sealing member 30 seals the metal member 10a so that the first and the second lead terminals 25 and 26 may be externally exposed.

When constructing the metal capacitors 110 and 120 by disposing the metal capacitors 10, it is possible to obtain a metal capacitor with the high voltage and the high capacity.

According to the present invention, it is possible to improve an electric conductivity by about 10,000 to 1,000,000 folds by applying a metal material for an electrolyte, in comparison to when using a conventional electrolyte or an organic semiconductor. Also, since the serial multi-laying is possible, high-voltage is enabled. Also, since the polarity has no directivity, a relatively higher safety is provided. Also, it is possible to improve a miniature, a low equivalent series resistance (ESR), a reduction in a ripple pyrexia, a long life, a heat-resistant stability, non-fuming, non-firing, and environment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A metal capacitor comprising:
   a longitudinally extending metal member comprising a groove forming portion disposed between an electrode withdrawing portion and a sealing portion respectively disposed at opposing longitudinal ends of the metal member, the groove forming portion having a plurality of grooves formed in two opposing sides thereof and extending in a direction transverse the longitudinal direction;

a metal oxide layer being formed on the two opposing sides of the metal member and grooves therein;

an insulating layer being formed on each of a portion of the electrode withdrawing portion and a portion of the sealing portion of the metal member;

a pair of main electrode layers, each main electrode layer being formed on the metal oxide layer that is formed in the grooves and on the two opposing sides of the groove forming portion of the metal member, each main electrode layer filling in the plurality of grooves; and a conductive connecting layer extending between the pair of main electrode layers to electrically connect one to the other, the conductive connecting layer extending over the insulating layer on the sealing portion of the metal member, wherein a pair of capacitor lead terminals are respectively connected to the electrode withdrawing portion of the metal member and the main electrode layers.

2. A metal capacitor comprising:

a longitudinally extending metal member comprising a groove forming portion disposed between an electrode withdrawing portion and a sealing portion respectively disposed at opposing longitudinal ends of the metal member, the groove forming portion having a plurality of grooves formed on two opposing sides thereof extending in a direction transverse the longitudinal direction;

a metal oxide layer being formed on the two opposing sides of the metal member and grooves therein;

a pair of seed electrode layers respectively formed in the grooves and on the two opposing sides of the groove forming portion of the metal member, each seed electrode layer being formed on the metal oxide layer formed on a respective side of the groove forming portion of the metal member;

a pair of main electrode layers being formed on the two opposing sides of the groove forming portion and overlaying the pair of seed electrode layers to fill in the plurality of grooves formed in the opposing sides of the groove forming portion of the metal member;

a conductive connecting layer extending between the pair of main electrode layers and being spaced from the sealing portion of the metal member by an insulating layer to electrically connect the pair of main electrode layers;

a first lead terminal being connected to the electrode withdrawing portion of the metal member;

a second lead terminal being connected to one of the main electrode layers; and a sealing member encompassing the metal member, the pair of main electrode layers and the conductive connecting layer and exposing the first and the second lead terminals external thereto.

3. The metal capacitor of claim 2, wherein the metal member uses any one of aluminum (Al), niobium (Nb), tantalum (Ta), titanium (Ti), and zirconium (Zr).

4. The metal capacitor of claim 2, wherein the plurality of grooves formed in the groove forming portion of the metal member is formed in the shape of a circle or a polygon.

5. The metal capacitor of claim 2, wherein the metal oxide layer uses any one of alumina ($Al_2O_3$), niobium monoxide (NbO), niobium pentoxide ($Nb_2O_5$), tantalum pentoxide ($Ta_2O_5$), titanium dioxide ($TiO_2$), and zirconium dioxide ($ZrO_2$).

6. The metal capacitor of claim 2, wherein each of the seed electrode layers, the main electrode layers, and the conductive connecting layer uses any one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au).

7. The metal capacitor of claim 2, wherein one of the pair of main electrode layers further comprises a conductive adhesive layer for connecting the second lead terminal.

8. The metal capacitor of claim 2, wherein the sealing member is sealed by a molding material or a cover member with hollow interior to form any one of a planar or cylindrical shape, and for the cylindrical shape, the metal member is wound in a cylindrical shape and then the sealing member seals the wound metal member.

9. A metal capacitor comprising:

a plurality of non-through type metal members, each comprising:

a longitudinally extending metal member comprising a groove forming portion disposed between an electrode withdrawing portion and a sealing portion respectively disposed at opposing longitudinal ends of the metal member, the groove forming portion having a plurality of grooves formed on two opposing sides thereof extending in a direction transverse the longitudinal direction;

a metal oxide layer being formed on the two opposing sides of the metal member and grooves therein;

a pair of seed electrode layers respectively formed in the grooves and on the two opposing sides of the groove forming portion of the metal member, each seed electrode layer being formed on the metal oxide layer formed on a respective side of the groove forming portion of the metal member;

a pair of main electrode layers being formed in the grooves and on the two opposing sides of the pair of seed electrode layers to fill in the plurality of grooves formed in the opposing sides of the groove forming portion of the metal member; and a conductive connecting layer extending between the pair of main electrode layers and being spaced from the sealing portion of the metal member by an insulating layer to electrically connect the pair of main electrode layers;

wherein the electrode withdrawing portions of the plurality of non-through type metal members are arranged to alternately face opposite directions and a conductive adhesive layer being interposed between adjacent main electrode layers of the plurality of non-through type metal members to adhere one to another;

a first lead terminal and a second lead terminal being respectively connected to the electrode withdrawing portions of the plurality of non-through type metal members facing one direction and the plurality of non-through type metal members facing the opposite direction; and a sealing member encompassing the plurality of non-through type metal members connected to the first and the second lead terminals and exposing the first and second lead terminals external thereto.

10. A metal capacitor comprising:
a plurality of non-through type metal members, each comprising:
- a longitudinally extending metal member comprising a groove forming portion disposed between an electrode withdrawing portion and a sealing portion respectively disposed at opposing longitudinal ends of the metal member, the groove forming portion having a plurality of grooves formed on two opposing sides thereof extending in a direction transverse the longitudinal direction;
- a metal oxide layer being formed on the two opposing sides of the metal member and grooves therein;
- a pair of seed electrode layers respectively formed in the grooves and on the two opposing sides of the groove forming portion of the metal member, each seed electrode layer being formed on the metal oxide layer formed on a respective side of the groove forming portion of the metal member;
- a pair of main electrode layers being formed in the grooves and on the two opposing sides of the pair of seed electrode layers to fill in the plurality of grooves formed in the opposing sides of the groove forming portion of the metal member; and
- a conductive connecting layer extending between the pair of main electrode layers and being spaced from the sealing portion of the metal member by an insulating layer to electrically connect the pair of main electrode layers;

wherein the electrode withdrawing portions of the plurality of non-through type metal members are arranged to all face the same direction and a conductive adhesive layer being interposed between adjacent main electrode layers of the plurality of non-through type metal members to adhere one to another;
a first polarity lead terminal being connected to the electrode withdrawing portions of the plurality of non-through type metal members;
a second polarity lead terminal being connected to one of the main electrode layers of the plurality of non-through type metal members; and
a sealing member encompassing the plurality of non-through type metal members connected to the first and the second polarity lead terminals and exposing the first and the second polarity lead terminals external thereto.

11. The metal capacitor of claim 10, wherein the first polarity lead terminal defines one of an anode electrode and a cathode electrode, and the second polarity lead terminal defines the other of a cathode electrode and an anode electrode.

12. The metal capacitor of claim 10, wherein one of the main electrode layers of the plurality of non-through type metal members connected to the second polarity lead terminal further comprises a conductive adhesive layer.

* * * * *